United States Patent [19]

Wich

[11] 4,092,806

[45] June 6, 1978

[54] KEY DUPLICATING MACHINE

[76] Inventor: Horst W. Wich, 816 Brent St., South Pasadena, Calif. 91030

[21] Appl. No.: 742,619

[22] Filed: Nov. 17, 1976

[51] Int. Cl.² .................... B24B 17/02; B21K 13/00
[52] U.S. Cl. .......................... 51/100 R; 29/76 C;
90/13.05
[58] Field of Search .............. 51/96, 100 R; 90/13.05;
76/110; 29/76 C

[56] References Cited

U.S. PATENT DOCUMENTS

| | | | |
|---|---|---|---|
| 1,462,150 | 7/1923 | Segal | 90/13.05 |
| 1,752,668 | 4/1930 | Johnson | 51/100 R |
| 1,866,034 | 7/1932 | Hansen | 90/13.05 |
| 2,167,008 | 7/1939 | Shepse | 90/13.05 |
| 3,902,382 | 9/1975 | Lieptz | 76/110 |

*Primary Examiner*—Harold D. Whitehead
*Assistant Examiner*—Nicholas P. Godici

[57] ABSTRACT

A key duplicating machine is provided comprising a rotatable grinding wheel having a cutting edge and a guide member having a reference edge. The guide member is disposed with its reference edge at a fixed distance from the cutting edge of the grinding wheel. A shaft having its axis disposed parallel to the axis of the grinding wheel is supported on linear bearings. A Y-shaped keyholder provides two angular arms with a key blank held on one and an existing key held on the other. The keyholder is attached to the shaft and disposed with its existing key biased to bear against the reference edge of the guide member and with its key blank adjacent the cutting edge of the grinding wheel. Thus, as the shaft is axially moved in its linear bearings, the keyholder is rocked about the shaft axis in accordance with the notches on the existing key to thereby move the key blank laterally into the grinding wheel to remove material therefrom.

3 Claims, 6 Drawing Figures

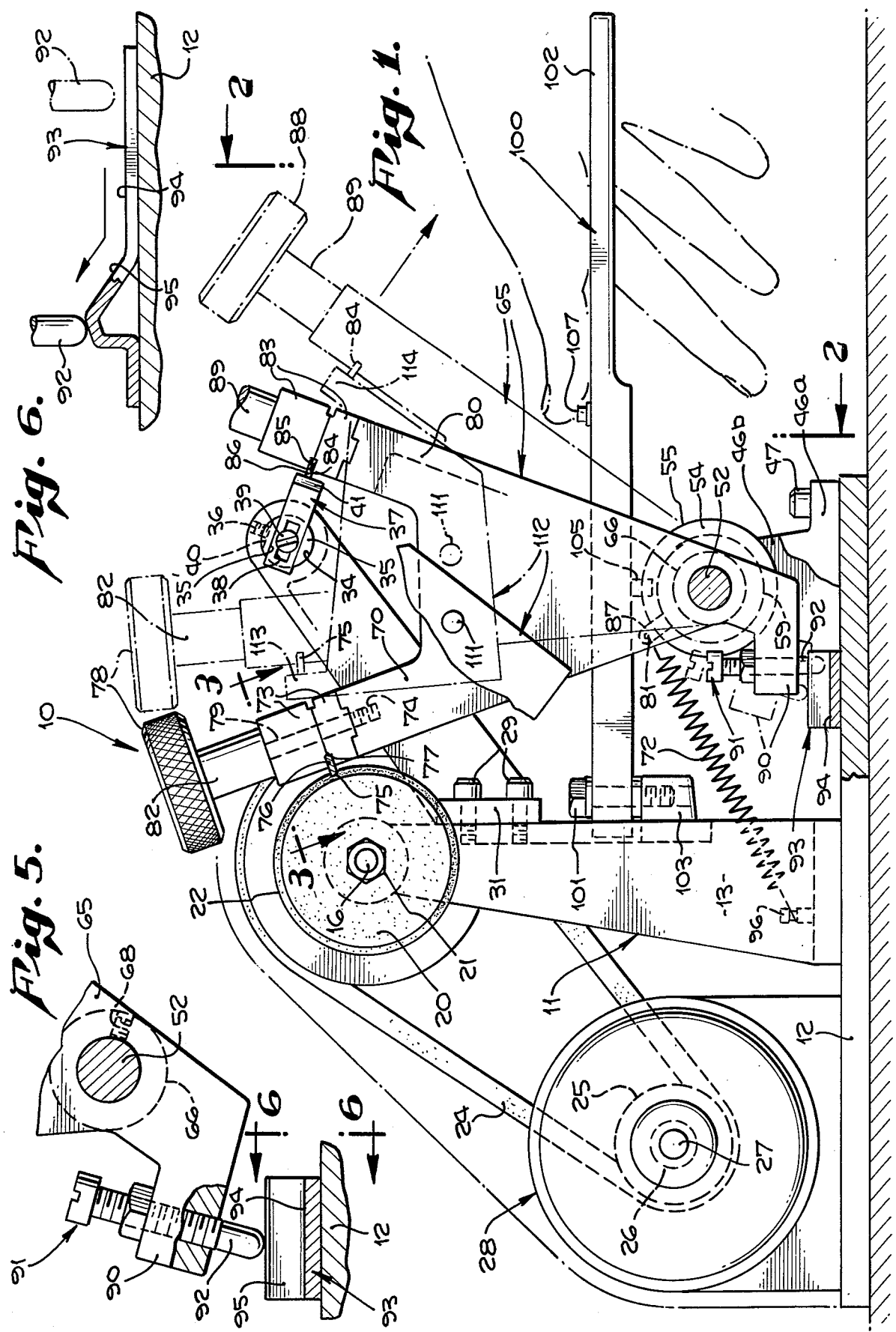

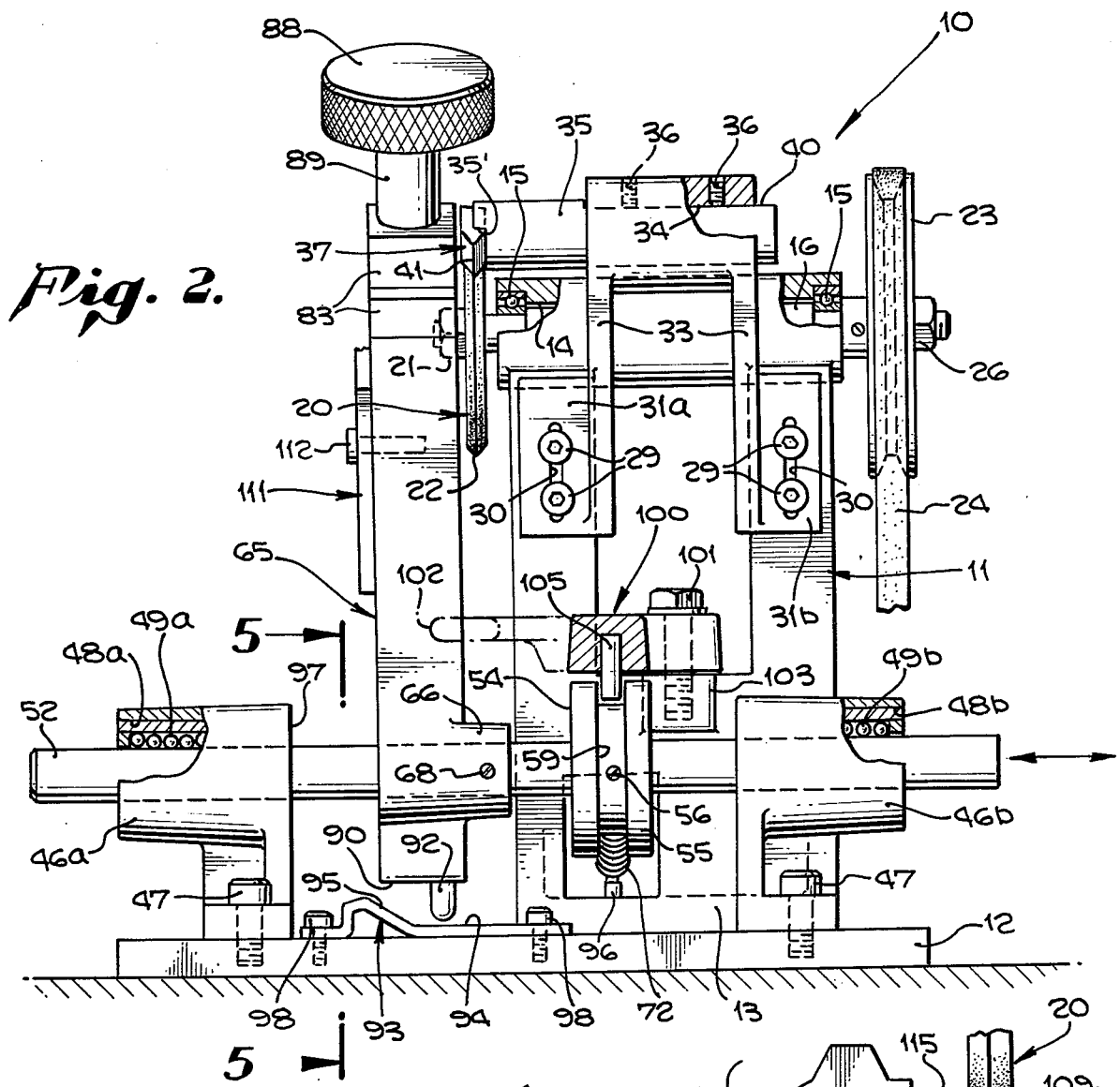

KEY DUPLICATING MACHINE

BACKGROUND AND SUMMARY OF THE INVENTION

This invention relates to a key duplicating machine and more particularly to such a machine that utilizes a grinding wheel to shape a key blank in accordance with an existing key.

The key duplicating machines of the prior art provide for punching a key blank to duplicate an existing key either by measurement of the notches of the existing key or by following a coding thereof as provided for the key. With such an approach, it is necessary to advance the key blank step-by-step past the punching station for successively forming notches of selected depth. It should be evident that such machines not only take time to operate but require expensive machining of the parts to provide for accuracy in the forming of notches of the proper shape and depth on the key blank.

According to the present invention, a key duplicating machine makes use of a rotating grinding wheel having a cutting edge. A reference edge on a fixed guide member is spaced from the cutting edge of the grinding wheel. A shaft having an axis extending parallel to the axis of rotation of the grinding wheel is disposed between the grinding wheel and the guide member. The shaft is supported in linear bearings such that it can be both rocked about and moved along the axis thereof. A Y-shaped keyholder provides two angular arms with the existing key to be duplicated held on one and the key blank held on the other. The keyholder is attached to the shaft and disposed with the existing key biased to bear against the reference edge of the guide member and with the key blank adjacent the cutting edge of the grinding wheel. Thus, as the existing key on the one arm of the keyholder is moved lengthwise past the guide member by moving the shaft along its axis, the keyholder is rocked about the shaft axis and causes the key blank on the other arm thereof to be moved laterally into the cutting edge of the grinding wheel to form the notches therealong. A projection is provided on the keyholder which cooperates with a linear cam to facilitate the loading and unloading of the key blank thereon. Thus, when the keyholder is moved along the shaft axis away from the vicinity of the grinding wheel, the projection provides for rocking the keyholder away from the cutting edge thereof.

Accordingly, one of the objects of the present invention is to provide an inexpensive key duplicating machine that utilizes a grinding wheel to cut notches on the key blank in accordance with notches on an existing key.

Another object of the present invention is to provide a key duplicating machine that duplicates the notches of an existing key on a key blank with a single swing of an operating arm.

Another object of the present invention is to provide a key duplicating machine that automatically rocks the holder for a key blank away from the vicinity of the cutting edge of the grinding wheel when the holder is moved into its normal rest position.

With these and other objects and advantages in view, the invention consists of the construction, arrangement and combination of the various parts of the device whereby the objects contemplated are obtained as hereinafter set forth, pointed out in the appended claims and illustrated in the accompanying drawings.

BRIEF DESCRIPTION OF THE DRAWINGS

FIG. 1 is a side elevation view of the key duplicating machine embodying the present invention;

FIG. 2 is a front view of the key duplicating machine as taken in the direction of arrows 2—2 in FIG. 1;

FIG. 3 illustrates in dashed lines a key blank being aligned on the keyholder by use of a positioning plate and illustrates in solid lines the key blank on the keyholder positioned adjacent the cutting edge of the grinding wheel;

FIG. 4 illustrates the movement of the key blank relative to the grinding wheel being controlled by the movement of the existing key passed the guide member;

FIG. 5 is a view as taken along line 5—5 of FIG. 2; and

FIG. 6 is a view as taken along line 6—6 in FIG. 5.

DETAILED DESCRIPTION OF THE INVENTION

Referring to the drawings, a fixed frame 11 includes a base 12 having an upright support 13 thereon. The upper end of the upright support 13 is formed with a cylindrical portion having a horizontal bore-opening 14 therethrough. The bore-opening 14 has ball bearings 15 secured on either end thereof in which a shaft 16 is journaled. A carborundum grinding wheel 20 having a V-shaped peripheral cutting edge 22 is attached to one end of shaft 16 by a nut 21. A pulley 23 is attached to the other end of shaft 16 by a nut 26. A belt 24 couples the pulley 23 to a pulley 25 on the drive shaft 27 of a motor 28 mounted on the base 13.

Attached to the front surface of the upright support 13 by screws 29 are a pair of holding plates 31a and 32b forming parts of an angularly upwardly extending cantilever 33. The screws 29 pass through vertically disposed slots 30 in the holding plates to enable the cantilever 33 to be vertically adjustably mounted relative to the upright support 12. The outer end of the cantilever 33 is provided with a horizontal bore-opening 34 in which a cylindrical rod 35 is held by screws 36 whose ends engage a flat 40 thereof.

Mounted in a slot 35' formed on the end of rod 35 is a lateral guide member 37. Guide member 37 is provided on the outer end thereof with a vertically disposed V-shaped reference edge 41 which conforms to the peripheral V-shaped cutting edge 22 of the grinding wheel 20. The guide member 37 has an elongated opening 38 through which a screw 39 passes to adjustably hold it on the end of rod 35.

It should be noted that by such a construction the mounting of the rod 35 is adjustable along its axis relative to the bore-opening 34. The slot 35' is formed on the end of rod 35 to support the guide member 37 so that its V-shaped reference edge 41 is disposed at an angle. Furthermore, the extent to which the V-shaped reference edge 41 of the guide member 37 extends beyond the outer end of the cantilever is adjustable by repositioning it along its slot 38 laterally relative to the rod.

A pair of mounts 46a and 46b are secured by bolts 47 on either end of the base 12 in front of the upright support 13. The mounts 46a and 46b have horizontal bore-openings 48a and 48b therethrough in which self-aligning linear bearings 49a and 49b are secured. A shaft 52 extends through the linear bearings 49a and 49b and is supported thereby such that it is readily movable therein in either direction along its axis. A collar 55 is secured to the central portion of the shaft by a set screw 56. The collar 55 is provided with an annular slot 59.

A Y-shaped keyholder 65 is provided with an inner angular arm 70 and an outer angular arm 80. The keyholder 65 has a hub 66 on the lower end thereof by which it is mounted onto the shaft 52 between the mount 46a and the collar 55. A set screw 68 secures the hub 66 to the shaft 52. One of the angular arms 70 of the keyholder 65 has a pair of holding jaws 73 mounted on the upper end thereof. The holding jaws 73 are held by a knob 78 having a reduced diameter threaded stem portion 79 on the lower end thereof which passes through openings in the pair of holding jaws 73 and engages a threaded hole 74 in the arm 70. The opposing surfaces on the rear of the pair of holding jaws 73 are machined to form a slot 76 provided with a shoulder 77. A key blank 75 is inserted in the slot 76 with its straight side seated against shoulder 77. The holding jaws 73 are then clamped by rotating the knob 78 to advance its threaded stem portion 79 such that its body 82 bears against the upper holding jaw 73.

The outer angular arm 80 of the Y-shaped holder 65 is similarly provided with a pair of holding jaws 83 on the upper end thereof. The opposing surfaces on the rear of the pair of holding jaws 83 are similarly machined to form a slot 84. An existing key 86 to be duplicated is inserted in the slot 84 with its straight side seated against shoulder 85. The pair of holding jaws 83 are similarly clamped by a knob 88 having a body 89 which bears against the upper jaw 83 to hold the existing key 86 in position. A tension spring 72 has one end 81 thereof attached to a pin 87 on the upper portion of the collar 55 and the other end 96 thereof attached to the upright support 13. The spring 72 urges the keyholder 65 to rock about the axis of the shaft 52 so as to maintain the notched side of the existing key 86 in contact with the V-shaped reference edge 41 of the guide member 47.

A horizontal projection 90 is integrally formed on the bottom of the Y-shaped keyholder 65. A vertically disposed screw member 91 is threaded in an opening on the outer end of the projection 90 with its bottom portion extending therebelow forming pin 92. Located on the base 12 below pin 92 is a linear cam 93 in the form of a strip having a flat portion 94 with a ramp 95 on the end thereof. The ends of the strip forming linear cam 93 are attached to the base 13 by screws 98.

An elongated operating arm 100 has its inner end pivotally connected by a bolt 101 on a boss 103 located on the fixed upright support 13. A pin 105 on the underside of the arm 100 rides in the annular slot 59 on the collar 55 to axially move the shaft 52 in its linear bearing 48a and 48b as the handle portion 102 of arm 100 is manually swung about its pivot provided by bolt 101.

When the handle portion 102 of the arm 100 is swung to the left (FIG. 2), the pin 92 on the projection 90 of keyholder 65 rides up on the ramp 95 of the linear cam 93. This causes the keyholder 65 to be rocked away from the cutting edge 22 of grinding wheel 20 into a normal rest position in which the operator can easily load or unload the key blank 75 in the holding jaws 73 without concern about accidentally touching the grinding wheel.

The keyholder 65 if provided with a positioning plate 112 in the form of a trapezoid, a portion of which only is shown in solid lines in FIGS. 1 and 2. The plate 112 is pivotally held on keyholder 65 by an off center pin 112. Plate 112 is provided with a key blank finger 113 on one other corner thereof and a existing key finger 114 on the opposite upper corner thereof. With the Y-shaped holder 65 rocked into its normal rest position, the positioning plate 112, which is normally in its skewed position, is manually pivoted and held in its substantially horizontal position as shown in dashed lines in FIG. 1. The existing key 86 is then seated in the slot 84 between holding jaws 83 with its shoulder 116 abutting the finger 114 of the positioning plate 112. The key 86 is then held in this position in keyholder 65 by clamping the holding jaws 83 by use of knob 88. Then, using the finger 114 as a reference, the key blank 75 is seated in the slot between the holding jaws 73 on the arm 70 with its shoulder 115 abutting the finger 113 of the positioning plate 112. The pair of holding jaws 73 are then tightened by use of knob 78. The positioning plate 112 is then permitted to tilt out of the way of the key blank 75 and the existing key 86 during the operation of cutting the key blank 75.

It should be noted that the rod 35 is adjusted along its axis in bore-opening 34 in which it is held such that the V-shaped reference edge 41 of the guide member lies in the same vertical plane as the peripheral V-shaped cutting edge 22 of the grinding wheel 20. Guide member 37 is held in slot 35' on the end of rod 35 with its reference edge 41 preferably perpendicular to the plane of the existing key 86. Furthermore guide member 37 is laterally adjusted to extend beyond the end of the rod 35 such that when it is aligned with the tip 108 of the reference key 86 the cutting edge 22 of the grinding wheel is aligned with the tip 109 of the key blank 75.

With the existing key 86 and the keyblank 75 now held in properly aligned operative positions on the respective arms of the keyholder, the operator upon grasping the handle portion 102 of arm 100 closes an electrical button switch 109 conveniently located thereon to energize the motor 28 which rotates the grinding wheel 20. The operator then need merely swing the arm 100 to the right, (FIG. 2) about its pivot provided by bolt 101, to cause the shaft 52 to slide along its axis within the linear bearings 49a and 49b. This causes the pin 92 on the projection 90 of the keyholder to ride down the ramp 95 of the linear cam 93 which action in combination with spring 72 causes the keyholder 65 to rock about the axis of the shaft 52 such that the existing key 86 moves into position adjacent the V-shaped reference edge 41 of the guide member 37. As the existing key continues to move to the right past the reference edge 41 of the guide member, the spring 72 urges the Y-shaped keyholder to rock laterally inwardly such that the notched surface of the existing key 86 on arm 80 is maintained in contact with the V-shaped reference edge 41 of the guide member 37 at all times. This causes the key blank 75 on the other angular arm 70 to rock laterally inwardly the same amount into the V-shaped peripheral cutting edge 22 of the grinding wheel 20.

Thus, with a single sweep of the operating arm 100 to the right from its inoperative normal rest position (FIG. 2), the grinding wheel 20 serves to remove material from the key blank 75 to produce a contour thereon that is a facsimile of the contour of the existing key 86. The operating arm 100 is then moved in the opposite direction, to the left, to move the keyholder 65 along the axis of shaft 52 in a direction away from the grind wheel 20. At that time, the pin 92 on the bottom of the projection 90 rides up on the ramp 95 of the linear cam and causes the keyholder 65 to be again moved laterally away from the cutting wheel, i.e., to rock about the axis of shaft 52, into its normal rest position.

It should be noted that as the shaft 52 slides in either direction along its axis within the linear bearings 48a and 48b during the operation of the machine, the side surface 97 of the mount 46a acts as a stop for the hub 66 of the keyholder 65 in one direction and the side surface 54 of the collar 55 acts as a stop for the hub 66 in the opposite direction.

While the description has been concerned with a particular illustrative embodiment of the present invention it will be appreciated that many modifications and variations in the construction and arrangement thereof may be provided without departing from the spirit and scope of the invention or sacrificing any of its advantages and the invention is therefore limited only as indicated by the scope of the appended claims.

What is claimed is:

1. A key duplicating machine comprising:
   a rotatable grinding wheel having a peripheral cutting edge;
   a guide member having a reference edge supported at a fixed distance relative to the cutting edge of said grinding wheel;
   a shaft disposed parallel to the axis of said grinding wheel;
   mounting means for supporting said shaft for movement along and for rotating about the axis thereof;
   a keyholder attached to said shaft, said keyholder providing for holding a key blank and an existing key having notches thereon;
   biasing means for causing said existing key on said keyholder to bear against the reference edge of the guide member as the shaft is moved along its axis to thereby cause said key blank on said keyholder to be rocked about the axis of the shaft laterally into the cutting edge of the grinding wheel to remove material therefrom in accordance with the notches on the existing key;
   a linear cam provided with a ramp thereon; and
   projecting means on said keyholder operable upon contacting the ramp on said linear cam as said keyholder is moved along the axis of said shaft to rock said keyholder about the axis of said shaft away from the cutting edge of the grinding wheel into a normal rest position.

2. The invention in accordance with claim 1 wherein the peripheral cutting edge of said grinding wheel and the reference edge of said guide member lie in the same vertical plane; and including a positioning plate which is pivotally mounted on the side of said keyholder, said plate having fingers on the upper opposite corners thereof for referencing the shoulders of the existing key and the key blank being held on the respective arms of the keyholder.

3. The invention in accordance with claim 1 wherein said coupling means includes a collar on said shaft, said collar having an annular groove, and a pin attached on said arm for engaging said annular groove on the collar.

* * * * *